United States Patent Office 3,655,734
Patented Apr. 11, 1972

3,655,734
BENZHYDRYLALKANOATES
Sidney B. Richter and David P. Mayer, Chicago, Ill., assignors to Velsicol Chemical Corporation, Chicago, Ill.
No Drawing. Filed Aug. 9, 1968, Ser. No. 751,359
Int. Cl. C07c 69/62
U.S. Cl. 260—487        6 Claims

ABSTRACT OF THE DISCLOSURE

This invention discloses new 2-dialkylaminobenzhydryl esters of aliphatic acids having the general formula

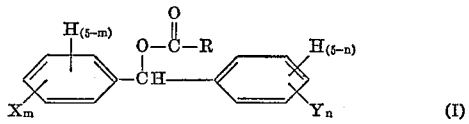

wherein Z is dialkylamino; X and Y are independently selected from the group consisting of alkyl, alkenyl, halogen, nitro, alkoxy, dialkylamino and alkylthio; m is an integer from 0 to 4; n is an integer from 0 to 5; R is selected from the group consisting of alkyl, alkenyl, haloalkyl, haloalkenyl, alkoxyalkyl, alkylthioalkyl, cyanoalkyl, thiocyanoalkyl, dialkylaminoalkyl, cycloalkyl and cycloalkenyl. The compounds of the above description are useful as pesticides, particularly acaricides, insecticides and fungicides.

This invention relates to new 2-dialkylaminobenzhydryl esters of aliphatic acids having the general formula

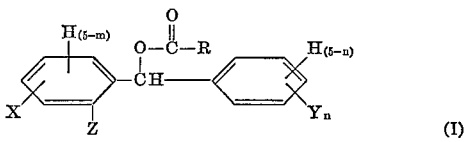

wherein Z is dialkylamino; X and Y are independently selected from the group consisting of alkyl, alkenyl, halogen, nitro, alkoxy, dialkylamino and alkylthio; m is an integer from 0 to 4; n is an integer from 0 to 5; R is selected from the group consisting of alkyl, alkenyl, haloalkyl, haloalkenyl, alkoxyalkyl, alkylthioalkyl, cyanoalkyl, thiocyanoalkyl, dialkylaminoalkyl, cycloalkyl and cycloalkenyl.

In a preferred embodiment of this invention, Z is di-(lower alkyl)amino; X and Y are independently selected from the group consisting of lower alkyl, lower alkenyl, halogen, nitro, lower alkoxy, di(lower alkyl)amino and lower alkylthio; m is an integer from 0 to 2; n is an integer from 0 to 3; and R is selected from the group consisting of lower alkyl, lower alkenyl, lower haloalkyl, lower alkoxyalkyl, lower alkylthioalkyl, lower cyanoalkyl, lower thiocyanoalkyl, lower dialkylaminoalkyl, and cycloalkyl and cycloalkenyl having from 3 to 8 carbon atoms. The term lower as used herein designates a straight or branched carbon chain of up to about 10 carbon atoms.

The compounds of the present invention are unexpectedly useful as pesticides and particularly as acaricides, insecticides and fungicides.

The compounds of the present invention, wherein the substituent R is selected from the group consisting of alkyl, alkenyl, haloalkyl, haloalkenyl, cycloalkyl and cycloalkenyl, can be readily prepared from a 2-dialkylaminobenzhydrol of the formula

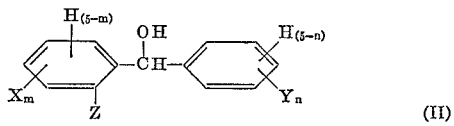

wherein Z, X, Y, m and n are as heretofore described, by reaction with a substituted or unsubstituted aliphatic acid chloride of the formula

wherein R is selected from the group consisting of alkyl, alkenyl, haloalkyl, haloalkenyl, cycloalkyl and cycloalkenyl. This reaction can be readily carried out in an inert organic solvent, such as benzene, in the presence of a base, such as triethylamine, by heating the reaction mixture for a period of from about 1 to about 24 hours at the reflux temperature of the reaction mixture. After the reaction is completed, the desired product can be isolated by first filtering the reaction mixture to remove the tertiary amine hydrochloride and thereafter evaporating the solvent. The product can then be used as such or can be further purified by washing, triturating, distillation, recrystallization or other common techniques known to the art.

The 2-dialkylaminobenzhydrol starting materials for preparing the compounds of the present invention can be prepared by several methods from the corresponding dialkylaminobenzophenone by reduction, for example, with lithium aluminum hydride. The dialkylaminobenzophenone can be prepared from the corresponding aminobenzophenone by alkylation procedures known to the art such as treatment with dimethyl sulfate, formic acid and formaldehyde, alkyl halides or alkenyl halides, and combinations thereof. In some cases the dialkylaminobenzophenone can be prepared from the corresponding halobenzophenone by reaction with dialkylamines such as N-methyl-N-ethylamine, N - methyl-N - isopropylamine, N-methyl-N-n-propylamine, N - methyl-N-n-butylamine, N-methyl - N - sec-butyl amine, N-methyl-N-amylamine, N-ethyl-N-n-propylamine, N-ethyl-N-isopropylamine and the like.

The aminobenzophenones can be readily prepared by the Friedel-Crafts reaction of a suitably substituted benzoyl chloride with aniline or a suitably substituted aniline. This reaction, well known in the art, can be carried out for example, by first heating an optionally substituted benzoyl chloride to about 120° C. and adding a substituted aniline thereto; then heating the reaction mixture to about 180° C. and adding zinc chloride thereto; and finally reacting the mixture at about 220° C. for a period of about ½ to about 4 hours. The reaction mixture can then be hydrolyzed by refluxing in the presence of acid, such as an aqueous solution of acetic acid and hydrogen bromide, for a period of from about 4 to about 24 hours. Thereafter the desired aminobenzophenone can be washed with organic base, dried and recovered by stripping of the solvent to yield a desired aminobenzophenone. The product can then be used as such or can be further purified by conventional procedures.

Exemplary suitable anilines are 4-chloroaniline, 4-bromoaniline, 4-methylaniline, 4-methoxyaniline, 4-methylthionaniline, 4-allylaniline, 2,4-dichloroaniline and the like.

Exemplary suitable benzoyl chlorides are 2-methylbenzoyl chloride, 4-chlorobenzoyl chloride, 4-methoxybenzoyl chloride, 3-methoxy-4-methylbenzoyl chloride, 3,4-dimethylbenzoyl chloride, 4-methylbenzoyl chloride, 2-chlorobenzoyl chloride, 4-nitrobenzoyl chloride, 2-allylbenzoyl chloride and the like.

The compounds of the present invention wherein the R substituent is selected from the group consisting of alkoxyalkyl, alkylthioalkyl, cyanoalkyl, thiocyanoalkyl and dialkylaminoalkyl can in many instances be prepared by the foregoing procedures. However, all of these compounds can be readily prepared from the corresponding compound having a halogen substituent, preferably a chlorine or bromine substituent, in the position where the alkoxy, alkylthio, cyano, thiocyano or dialkylamino moiety is desired.

Thus, the cyano and thiocyano moieties can be introduced into the R substituent having a halogen in the desired position via the nitrile synthesis by reaction with sodium cyanide or sodium thiocyanide. Alkoxy and alkylthio moieties can be introduced in a like manner via the well known Williamson synthesis by reaction with sodium alkoxides and their sulfur analogues. The dialkylamino moiety can be introduced into the R substituent having a halogen in the desired position by reaction with 2 moles of dialkylamine per mole of benzhydryl ester.

All of these substitution reactions can be effected in an inert reaction medium such as ethanol. Mild reaction conditions such as ambient temperatures are usually sufficient but elevated temperatures, up to about the reflux temperature of the reaction mixture can be employed to carry out these reactions. After the reactions are completed the desired products can be readily recovered by first filtering the reaction mixture to remove any inorganic salts, as in the nitrile synthesis and Williamson synthesis, or amine hydrochlorides, and thereafter evaporating the solvent used. The products can then be used as such or can be further purified by common methods in the art.

The manner in which the compounds of the present invention can be prepared readily is illustrated in the following examples.

EXAMPLE 1

Preparation of 2-amino-5-chloro-2'-methylbenzophenone

Ortho-anisoyl chloride (2120 grams) was charged into a 12 liter glass reaction flask equipped with a stirrer, thermometer and reflux condenser topped by a drying tube, and was heated to about 120° C. Para-chloroaniline (1000 grams) was slowly added to the flask with continuous stirring. The reaction mixture was then heated to about 180° C. and dry zinc chloride (1252 grams) was added thereto. Thereafter the mixture was heated at 220 to 225° C. for a period of about 3½ hours. After this time the mixture was cooled to about 130° C. and an aqueous solution of a 1:1 mixture of hydrogen bromide and glacial acetic acid (5 liters; 48%) was added. The resulting mixture was refluxed, with stirring for a period of about 17 hours. The mixture was then concentrated by stripping some of the solvent under reduced pressure and was poured over crushed ice (4 kg.). To the ice mixture was added aqueous sodium hydroxide (4 liters; 5 M) and the resulting mixture was extracted with methylene chloride (6 liters). The methylene chloride solution was washed with aqueous hydrogen chloride and with water, was dried over magnesium sulfate, filtered and evaporated. The resulting residue was vacuum distilled to yield 2-amino-5-chloro-2'-methylbenzophenone having a boiling point of 155 to 165° C. at 0.25 mm. of Hg pressure.

EXAMPLE 2

Preparation of 2-dimethylamino-5-chloro-2'-methylbenzophenone

2 - amino - 5 - chloro - 2' - methylbenzophenone (1600 grams), an aqueous solution of formaldehyde (2 liters; 38%) and formic acid (3 liters; 98%) were charged into a 12 liter glass reaction flask equipped with a stirrer and reflux condenser. The mixture was heated at reflux for a period of about 17 hours. After this time the mixture was poured over crushed ice and was extracted with ether. The ether extracts were combined and were washed with aqueous sodium hydroxide (7 liters; 3 N) and with water. The washed ether solution was dried over magnesium sulfate, filtered, and was evaporated on a steam bath. The resulting residue was vacuum distilled to yield 2-dimethylamino - 5 - chloro-2'-methylbenzophenone having a boiling point of 150 to 160° C. at 0.2 mm. of Hg pressure.

EXAMPLE 3

Preparation of 2-dimethylamino-5-chloro-2'-methylbenzhydrol

A solution of lithium aluminum hydride (1.5 grams) in ether (100 ml.) was charged with stirring into a 250 ml. glass reaction flask equipped with mechanical stirrer, internal thermometer and reflux condenser. A solution of 2 - dimethylamino-5-chloro-2'-methylbenzophenone (5.9 grams) in ether (100 ml.) was then slowly added to the flask over a period of about 15 minutes. The reaction mixture was heated at reflux for a period of about 3½ hours. The mixture was cooled to room temperature and potassium tartrate (1.5 grams) dissolved in water (6 ml.) was added thereto. The resulting mixture was allowed to stand at room temperature overnight. The mixture was then filtered and the filtrate distilled under reduced pressure to yield 2 - dimethylamino-5-chloro-2'-methylbenzhydrol having a boiling point of 143 to 152° C. at 0.15 mm. of Hg pressure.

EXAMPLE 4

Preparation of 2-dimethylamino-5-chloro-2'-methylbenzhydryl acetate 2-dimethylamino - 5 - chloro-2'-methylbenzhydrol (9.2 grams; 0.034 mol), acetyl chloride (3 grams; 0.037 mol), triethylamine (3.8 grams) and benzene (60 ml.) were charged into a 250 ml. glass reaction flask equipped with stirrer and reflux condenser. The reaction mixture was heated at reflux for a period of about 4 hours with continuous stirring. After this time the reaction mixture was cooled to room temperature and filtered to remove the triethylamine hydrochloride which had formed. The filtrate was washed with a 10% aqueous sodium hydroxide solution (100 ml.) and with water and was dried over anhydrous magnesium sulfate and filtered. The filtrate was then stripped of solvent and the remaining residue was distilled under reduced pressure to yield 2-di-methylamino-5-chloro-2'-methylbenzhydryl acetate as a pale yellow viscous liquid boiling at 131 to 135° C. at 0.07 mm. of Hg pressure.

EXAMPLE 5

Preparation of 2-dimethylamino-5-chloro-2'-methylbenzhydryl α-chloroacetate 2-dimethylamino-5-chloro - 2' - methylbenzhydrol (9.2 grams; 0.034 mol), α-chloroacetyl chloride (3.8 grams; 0.034 mol), triethylamine (3.8 grams) and benzene (60 ml.) were charged into a 250 ml. glass reaction flask equipped with stirrer and reflux condenser. The reaction mixture was heated at reflux for a period of about 4 hours with continuous stirring. After this time the reaction mixture was cooled to room temperature and filtered. The filtrate was washed with a 10% aqueous sodium hydroxide solution (100 ml.) and with water, was dried over anhydrous magnesium sulfate and filtered. The filtrate was stripped of solvent under reduced pressure to yield 2-dimethylamino-5-chloro-2'-methylbenzhydryl α - chloroacetate as a deep yellow viscous liquid having a boiling point of 160 to 165° C. at 0.1 mm. of Hg pressure.

EXAMPLE 6

Preparation of 2-dimethylamino-5-chloro-2'-methylbenzhydryl propionate

2 - dimethylamino-5-chloro-2'-methylbenzhydrol (3.2 grams; 0.012 mol), propionyl chloride (2 grams; 0.02 mol), triethylamine (2 grams) and benzene (50 ml.) were charged into a 250 ml. glass reaction flask equipped with mechanical stirrer and reflux condenser. The reaction mixture was heated at reflux for a period of about 3 hours with continuous stirring. After this time the reaction mixture was cooled to room temperature and filtered. The filtrate was washed with aqueous sodium hydroxide and water, dried over magnesium sulfate and filtered. The resulting dried filtrate was evaporated under reduced pressure to yield 2-dimethylamino-5-chloro-2'-methylbenzhydryl propionate as a yellow viscous liquid having a boiling point of 142 to 150° C. at 0.03 mm. of Hg pressure.

EXAMPLE 7

Preparation of 2-dimethylamino-5-chloro-2'-methylbenzhydryl β-chloropropionate 2-dimethylamino-5-chloro - 2' - methylbenzhydrol (2.7 grams; 0.01 mol), β-chloropropionyl chloride (2 grams; 0.016 mol), triethylamine (2 grams) and benzene (50 ml.) were charged into a 250 ml. glass reaction flask equipped with stirrer and reflux condenser. The reaction mixture was heated at reflux for a period of about 5 hours. After this time the reaction mixture was cooled to room temperature and filtered. The filtrate was washed with aqueous sodium hydroxide and with water and dried over magnesium sulfate. The dried solution was stripped of solvent and the residue vacuum distilled to yield 2-dimethylamino-5 - chloro-2'-methylbenzhydryl β-chloropropionate as a viscous liquid having a boiling point of 130 to 140° C. at 0.15 mm. of Hg pressure.

EXAMPLE 8

Preparation of 2-dimethylamino-5-chloro-2'-methylbenzhydryl α-bromo-α-methylpropionate 2 - dimethylamino-5-chloro-2'-methylbenzhydrol (2.7 grams; 0.01 mol), α - bromo-α-methylpropionyl bromide (2.5 grams; 0.014 mol), triethylamine (2 grams) and benzene (50 ml.) were charged into a 250 ml. glass reaction flask equipped with stirrer and reflux condenser. The reaction mixture was then heated at reflux for a period of about 5 hours with continuous stirring. After this time the reaction mixture was cooled to room temperature and filtered. The filtrate was washed with a 10% aqueous sodium hydroxide solution and with water, dried over anhydrous magnesium sulfate and filtered. The filtrate was evaporated under reduced pressure to yield a residue which solidified upon standing. The residue was recrystallized from ethanol to yield 2-dimethylamino-5-chloro-2'-methylbenzhydryl α-bromo - α - methylpropionate as a tan solid having a melting point of 117.5 to 121° C.

EXAMPLE 9

Preparation of 2-dimethylamino-5-chloro-2'-methylbenzhydryl α-chloropropionate

2 - dimethylamino-5-chloro-2'-methylbenzhydrol (2.7 grams; 0.01 mol), α-chloropropionyl chloride (2 grams; 0.016 mol), triethylamine (2 grams) and benzene (50 ml.) were charged into a 250 ml. glass reaction flask equipped with stirrer and reflux condenser. The reaction mixture was heated at reflux, with continuous stirring, for a period of about 5 hours. After this time the reaction mixture was filtered and the filtrate washed with aqueous sodium hydroxide solution and water. The washed solution was dried over magnesium sulfate, filtered and evaporated to yield a viscous oil. The oil was vacuum distilled to yield 2-dimethylamino-5-chloro-2'-methylbenzhydryl α-chloropropionate having a boiling point of 155 to 160° C. at 0.05 mm. Hg pressure.

EXAMPLE 10

Preparation of 2-dimethylamino-5-chloro-2'-methylbenzhydryl isobutyrate 2-dimethylamino-5-chloro - 2' - methylbenzhydrol (3.6 grams; 0.013 mol), isobutyryl chloride (2 grams; 0.02 mol), triethylamine (2 grams) and benzene (50 ml.) were charged into a 250 ml. glass reaction flask equipped with mechanical stirrer and reflux condenser. The reaction mixture was heated, with stirring, for a period of about 4 hours. After this time the reaction mixture was cooled and filtered. The filtrate was washed with aqueous sodium hydroxide and water and was dried over anhydrous magnesium sulfate. The dried solution was stripped of solvent and the resulting residue distilled under reduced pressure to yield 2-dimethylamino-5-chloro-2'-methylbenzhydryl isobutyrate having a boiling point of 137 to 142° C. at 0.05 mm. of Hg pressure.

EXAMPLE 11

Preparation of 2-dimethylamino-5-chloro-2'-methylbenzhydryl isovalerate 2-dimethylamino-5-chloro - 2' - methylbenzhydrol (3.4 grams; 0.12 mol), isovaleryl chloride (2 grams; 0.017 mol), triethylamine (2 grams) and benzene (50 ml.) were charged into a 250 ml. glass reaction flask equipped with stirrer and reflux condenser. The reaction mixture was heated at reflux with continuous stirring for a period of about 4 hours. After this time the mixture was cooled and filtered. The filtrate was washed with aqueous sodium hydroxide and water and was dried over anhydrous magnesium sulfate. The dried solution was then stripped of solvent and the resulting residue was distilled under reduced pressure to yield 2-dimethylamino-5-chloro-2'-methylbenzhydryl isovalerate as a viscous liquid having a boiling point of 145 to 153° C. at 0.07 mm. of Hg pressure.

EXAMPLE 12

Preparation of 2-dimethylamino-5-chloro-2'-methylbenzhydryl pivalate 2-dimethylamino-5-chloro - 2' - methylbenzhydrol (2.9 grams; 0.011 mol), pivalyl chloride (2 grams; 0.017 mol), triethylamine (2 grams) and benzene (50 ml.) were charged into a 250 ml. glass reaction flask equipped with mechanical stirrer and reflux condenser. The reaction mixture was heated at reflux with continuous stirring for a period of about 5 hours. After this time the mixture was cooled and filtered. The filtrate was washed with aqueous sodium hydroxide and water and was dried over magnesium sulfate. The dried solution was stripped of solvent to yield a residue which solidified upon standing. The solid residue was then recrystallized from hexane to yield 2-dimethylamino-5-chloro - 2' - methylbenzhydryl pivalate as a white solid having a melting point of 126 to 128° C.

EXAMPLE 13

Preparation of 2-dimethylamino-5-chloro-2'-methylbenzhydryl cyclohexylcarboxylate 2-dimethylamino-5-chloro - 2' - methylbenzhydrol (2.7 grams; 0.01 mol), cyclohexylcarbonyl chloride (2 grams; 0.013 mol), triethylamine (2 grams) and benzene (50 ml.) were charged into a glass reaction flask equipped with stirrer and reflux condenser. The reaction mixture was heated at reflux for a period of about 17 hours with continuous stirring. After this time the reaction mixture was cooled and filtered. The filtrate was washed with aqueous sodium hydroxide and water and was dried over magnesium sulfate. The dried solution was filtered and evaporated under reduced pressure resulting in a solid residue. The residue was recrystallized from ethanol to yield 2-dimethylamino-5-chloro - 2' - methylbenzhydryl cyclohexylcarboxylate as a white solid having a melting point of 94 to 95° C.

EXAMPLE 14

Preparation of 2-dimethylamino-5-chloro-2'-methylbenzhydryl crotonate 2-dimethylamino-5-chloro - 2' - methylbenzhydrol (3.7 grams; 0.013 mol), crotonic chloride (2 grams; 0.02 mol), triethylamine (2 grams) and benzene (50 ml.) were charged into a 250 ml. glass reaction flask equipped with stirrer and reflux condenser. The reaction mixture was heated at reflux for a period of about 5 hours with continuous stirring. After this time the reaction mixture was cooled and filtered. The filtrate was washed with aqueous sodium hydroxide and water and was dried over magnesium sulfate. The dried solution was filtered and stripped of solvent under reduced pressure. The residue was vacuum distilled to yield 2-dimethylamino-5-chloro-2'-methylbenzhydryl crotonate as a pale yellow liquid having a boiling point of 147 to 150° C. at 0.1 mm. of Hg pressure.

EXAMPLE 15

Preparation of 2-dimethylamino-5-chlorobenzhydryl acetate 2-dimethylamino-5-chlorobenzhydrol (2.7 grams; 0.01 mol), acetyl chloride (1.5 grams; 0.018 mol), triethylamine (2 grams) and benzene (50 ml.) were charged into a 250 ml. glass reaction flask equipped with mechanical stirrer and reflux condenser. The reaction mixture was heated at reflux with stirring for a period of about 17 hours. After this time the reaction mixture was cooled and filtered. The filtrate was washed with aqueous sodium hydroxide and water and was dried over anhydrous magnesium sulfate. The dried solution was then stripped of solvent and the resulting residue distilled under reduced pressure to yield 2-dimethylamino-5-chlorobenzhydryl acetate as a pale yellow liquid having a boiling point of 130 to 132° C. at 0.05 mm. of Hg pressure.

EXAMPLE 16

Preparation of 2-dimethylamino-5-chlorobenzhydryl crotonate 2-dimethylamino-5-chlorobenzhydrol (3.3 grams; 0.012 mol), crotonic chloride (2 grams; 0.02 mol), triethylamine (2 grams) and benzene (50 ml.) were charged into a 250 ml. glass reaction flask equipped with stirrer and reflux condenser. The reaction mixture was heated at reflux for a period of about 5 hours. After this time the mixture was cooled and filtered. The filtrate was washed with aqueous sodium hydroxide and water and was dried over magnesium sulfate. The dried solution was evaporated under reduced pressure and the residue was dissolved in a hexane ether mixture and filtered. The filtered solution was then evaporated under reduced pressure and the resulting residue vacuum distilled to yield 2-dimethylamino-5-chlorobenzhydryl crotonate as a pale yellow liquid having a boiling point of 152 to 157° C. at 0.15 mm. of Hg pressure.

EXAMPLE 17

Preparation of 2-dimethylamino-5-chloro-4'-methylbenzophenone

Para-methylbenzoyl chloride (33.3 grams) was heated with stirring to about 120° C. in a glass reaction flask equipped with mechanical stirrer, internal thermometer and reflux condenser. Para-chloroaniline (12.8 grams) was added to the reaction flask and the mixture heated to about 180° C. Dry zinc chloride (17.4 grams) was added and the reaction mixture heated to a temperature of from about 220 to about 240° C. for a period of about 2 hours. After this time the reaction mixture was cooled to about 120° C. A mixture of glacial acetic acid (40 ml.) and hydrogen bromide (40 ml.; assay 48%) was added and refluxed overnight. After this time the reaction mixture was concentrated under reduced pressure by removing excess solvent. The residue was refluxed for about 40 minutes in sulfuric acid (64 ml.; 75% v./v.) and poured onto crushed ice. The resulting mixture was extracted with ether and the ether extract first washed with sodium hydroxide (100 ml.; 3 N) and then with water. The extract was dried over magnesium sulfate, filtered and evaporated. The residue was distilled to yield 2-amino-5-chloro-4'-methylbenzophenone.

2-amino-5-chloro-4'-methylbenzophenone (8.4 grams), formic acid (23 ml.) and formaldehyde (15 ml.; assay 38%) were charged into a 250 ml. glass reaction flask equipped with mechanical stirrer, reflux condenser and internal thermometer. The reaction mixture was refluxed for a period of about 17 hours. After this time the mixture was diluted with water (200 ml.) and extracted twice with ether. The two ether extracts were combined, washed first with aqueous sodium hydroxide (100 ml.; 3 N) and then with water. The washed extract was dried over magnesium sulfate, filtered and evaporated. The residue was distilled to yield 2-dimethylamino-5-chloro-4'-methylbenzophenone as a yellow liquid having a boiling point of 136 to 141° C. at 0.02 mm. of Hg pressure.

EXAMPLE 18

Preparation of 2-dimethylamino-5-chloro-4'-methylbenzhydrol

A solution of lithium aluminum hydride (1.5 grams) in ether (100 ml.) was charged with stirring into a 250 ml. glass reaction flask equipped with mechanical stirrer, internal thermometer and reflux condenser. A solution of 2 - dimethylamino-5-chloro-4'-methylbenzophenone (7.0 grams) in ether (100 ml.) was then slowly added to the flask over a period of about 15 minutes. The reaction mixture was then heated at reflux with continuous stirring for a period of about 6 hours. The reaction mixture was cooled to room temperature and a solution of sodium potassium tartrate (1.5 grams) dissolved in water (6 ml.) was added dropwise with stirring thereto. The resulting mixture was filtered and the filter cake washed with ether. The filtrate was dried and evaporated to yield a liquid residue. The residue was distilled under vacuum to yield 2-dimethylamino - 5 - chloro-4'-methylbenzhydrol having a boiling point of 137 to 142° C. at 0.05 mm. of Hg pressure.

EXAMPLE 19

Preparation of 2-dimethylamino-5-chloro-4'-methylbenzhydryl acetate 2-dimethylamino-5-chloro - 4' - methylbenzhydrol (7 grams; 0.025 mol), acetyl chloride (2.5 grams; 0.03 mol), triethylamine (3.5 grams) and benzene (50 ml.) were charged into a 250 ml. glass reaction flask equipped with stirrer, thermometer and reflux condenser. The reaction mixture was heated at reflux with stirring for a period of about 4 hours. After this time the mixture was cooled and filtered. The filtrate was then washed with aqueous sodium hydroxide and water and was dried over magnesium sulfate. The dried solution was stripped of solvent, leaving a white solid as the residue. The residue was recrystallized from hexane to yield 2-dimethylamino-5-chloro-4'-methylbenzhydryl acetate as a white solid having a melting point of 102.5 to 104.5° C.

EXAMPLE 20

Preparation of 2-dimethylamino-5-chloro-4'-methylbenzhydryl α-chloroacetate 2-dimethylamino - 5 - chloro-4'-methylbenzhydrol (7 grams; 0.025 mol), chloroacetyl chloride (3 grams; 0.03 mol), triethylamine (3.4 grams) and benzene (50 ml.) were charged into a 250 ml. glass reaction flask equipped with a stirrer, internal thermometer and reflux condenser. The reaction mixture was heated at reflux with stirring for a period of about 4 hours. After this time the reaction mixture was cooled and filtered. The filtrate was washed with aqueous sodium hydroxide and water and dried over magnesium sulfate. The dried solution was then stripped of solvent to yield a brown semisolid residue. The residue was extracted with ether and was filtered. The filtrate was evaporated to yield a brown residue which solidified upon trituration with pentane. The solid was then recrystallized twice with hexane to yield 2-dimethylamino-5-chloro-4'-methylbenzhydryl α-chloroacetate as a tan solid having a melting point of 66 to 68° C.

EXAMPLE 21

Preparation of 2-dimethylamino-5-chloro-4'-methylbenzhydryl pivalate

2 - dimethylamino - 5 - chloro - 4' - methylbenzhydrol (2.7 grams; 0.01 mol), pivalyl chloride (2 grams; 0.017 mol), triethylamine (2 grams) and benzene (50 ml.) were charged into a glass reaction vessel equipped with stirrer, thermomester and reflux condenser. The reaction mixture was then heated at reflux for a period of about 5 hours. After this time the mixture was cooled and filtered. The filtrate was then washed with aqueous sodium hydroxide and water and was dried over anhydrous magnesium sulfate. The dried solution was evaporated and the resulting residue distilled under reduced pressure to yield 2 - dimethylamino - 5-chloro-4'-methylbenzhydryl pivalate as a yellow viscous liquid having a boiling point of 148 to 153° C. at 0.03 mm. of Hg pressure.

EXAMPLE 22

Preparation of 2-dimethylamino-5-chlorobenzhydryl α-cyanoacetate

2 - dimethylamino - 5 - chlorobenzhydryl α-chloroacetate (16.9 grams; 0.05 mol), ether (100 ml.) and ethanol (100 ml.) are charged into a 500 ml. glass reaction flask equipped with a mechanical stirrer and reflux condenser. Sodium cyanide (2.5 grams; 0.05 mol) dissolved in water, is slowly added to the flask and the reaction mixture is heated, with stirring, at a temperature of about 50° C. for a period of about 4 hours. After this time the reaction mixture is cooled and filtered. The filtrate is evaporated under reduced pressure to yield the desired product 2-dimethylamino-5-chlorobenzhydryl α-cyanoacetate as the residue.

EXAMPLE 23

Preparation of 2-dimethylamino-5-chlorobenzhydryl β-dimethylaminopropionate

2 - dimethylamino - 5 - chlorobenzhydryl β-chloropropionate (3 grams; 0.01 mol) and benzene (100 ml.) are charged into a glass reaction vessel equipped with a mechanical stirrer and reflux condenser. Dimethylamine (1 gram; 0.02 mol) is added to the flask and the reaction mixture is heated, with stirring, at reflux for a period of about 4 hours. After this time the reaction mixture is cooled and filtered to remove the dimethylamine hydrochloride that has formed. The filtrate is washed with water, dried over magnesium sulfate and is stripped of solvent to yield 2-dimethylamino-5-chlorobenzhydryl β-dimethylaminopropionate.

EXAMPLE 24

Preparation of 2-dimethylamino-5-chlorobenzhydryl α-methoxyacetate

2 - dimethylamino - 5 - chlorobenzhydrol (3.1 grams; 0.013 mol), a α-methoxyacetyl chloride (2 grams; 0.02 mol), trietyhlamine (2 grams) and benzene (50 ml.) were charged into a 250 ml. glass reaction flask equipped with a mechanical stirrer and reflux condenser. The reaction mixture was heated, with stirring, at the reflux temperature of the mixture for a period of about 5 hours. After this time the mixture was cooled to room temperature and was filtered to remove the triethylamine hydrochloride which had formed. The filtrate was washed with aqueous sodium hydroxide and water and was dried over magnesium sulfate. The dried solution was filtered and evaporated under reduced pressure. The residue was distilled to yield 2-dimethylamino-5-chlorobenzhydryl α-methoxyacetate as a yellow liquid having a boiling point of 147 to 155° C.

EXAMPLE 25

Preparation of 2-dimethylamino-5-chloro-2'-methyl benzhydryl α-methylthioacetate 2 - dimethylamino - 5 - chloro-2' - methylbenzhydrol (2.4 grams; 0.01 mol), α-methylthioacetyl chloride (1.9 grams; 0.015 mol), triethylamine (2 grams) and benzene (50 ml.) are charged into a 250 ml. glass reaction flask equipped with a mechanical stirrer and reflux condenser. The reaction mixture is heated, with stirring, at reflux for a period of about 6 hours. After this time the mixture is cooled to room temperature and is filtered to remove the triethylamine hydrochloride. The filtrate is washed with aqueous sodium hydroxide and water, and is dried over magnesium sulfate. The dried solution is filtered and stripped of solvent under reduced pressure to yield 2-dimethylamino - 5-chloro-2-'methylbenzhydryl α-methylthioacetate.

Additional compounds can be prepared in a manner similar to that detailed in the foregoing examples. In the following examples are given the essential ingredients required to prepare the indicated named compounds by the procedures heretofore described.

EXAMPLE 26

2 - dimethylamino - 5 - chlorobenzhydrol+γ - ethoxypropionyl chloride+triethylamine=2 - dimethylamino - 5-chlorobenzhydryl γ-ethoxypropionate.

EXAMPLE 27

2 - dimethylamino - 5 - chlorobenzhydryl β - chloropropionate+di - n - butylamine=2 - dimethylamino - 5-chlorobenzhydryl β-di-n-butylaminopropionate.

EXAMPLE 28

2 - dimethylamino - 5 - bromobenzhydrol+acetyl chloride+triethylamine=2 - dimethylamino - 5 - bromobenzhydryl acetate.

EXAMPLE 29

2 - diethylamino - 5 - chlorobenzhydrol+propionyl chloride+triethylamine=2 - diethylamino - 5 - chlorobenzhydryl propionate.

EXAMPLE 30

2 - di - n - propylamino - 5 - fluoro - 2' - isopropylbenzhydrol+butyryl chloride+triethylamine=2 - di-n-propylamino-5-fluoro-2'-isopropylbenzhydryl butyrate.

EXAMPLE 31

2 - di - n - pentylamino - 4 - iodo - 4' - nitrobenzhydrol+pentanoyl chloride+triethylamine=2 - di - n - pentylamino-4-iodo-4'-nitrobenzhydryl pentanoate.

EXAMPLE 32

2 - di - n - decylamino - 4,5 - dichloro - 4' - allylbenzhydrol+hexanoyl chloride+triethylamine=2 - di - n - decylamino-4,5-dichloro-4'-allylbenzhydryl hexanoate.

EXAMPLE 33

2 - dimethylamino - 4 - methoxy - 3',4' - dichlorobenzhydrol+heptanoyl chloride+triethylamine=2 - dimethylamino - 4 - methoxy - 3',4' - dichlorobenzhydryl heptanoate.

EXAMPLE 34

2 - diethylamino - 5 - isopropoxy - 4' - methylthiobenzhydrol+octanoyl chloride+triethylamine=2 - diethylamino - 5 - isopropoxy - 4' - methylthiobenzhydroyl octanoate.

EXAMPLE 35

2 - dimethylamino - 4 - nitro - 3' - pentyloxybenzhydrol+decanoyl chloride+triethylamine=2 - dimethylamino-4-nitro-3'-pentyloxybenzhydryl decanoate.

EXAMPLE 36

2 - dimethylamino - 5 - methyl - 4' - pentyloxybenzhydrol+acryloyl chloride+triethylamine=2 - dimethylamino-5-methyl-4'-pentyloxybenzhydryl acrylate.

EXAMPLE 37

2-dimethylamino-5-chloro-3'-methylbenzhydrol+methacryloyl chloride+triethylamine=2 - dimethylamino - 5-chloro-3'-methylbenzhydryl methacrylate.

EXAMPLE 38

2-dimethylamino-5-chloro-2'-methylbenzhydrol+vinylacetyl chloride+triethylamine=2 - dimethylamino - 5-chloro-2'-methylbenzhydryl vinylacetate.

EXAMPLE 39

2-di-n-butylamino-4-ethyl-5-chloro-4'-pentylbenzhydrol +2-pentenoyl chloride+triethylamine=2-di - n - butylamino-4-ethyl-5-chloro-4'-pentylbenzhydryl 2-pentenoate.

EXAMPLE 40

2-diethylamino-4-allyl-3'-pentenylbenzhydrol+2-methyl-2-pentenoyl chloride+triethylamine=2 - diethylamino-4-allyl-3'-pentenylbenzhydryl 2-methyl-2-pentenoate.

EXAMPLE 41

2-dimethylamino-3-bromo-4-n - propylthiobenzhydrol+ 2-hexenoyl chloride+triethylamine=2-dimethylamino-3-bromo-4-n-propylthiobenzhydryl 2-hexenoate.

EXAMPLE 42

2-dimethylamino-6-ethoxy-4' - decyloxybenzhydrol+4-heptenoyl chloride+triethylamine=2-dimethylamino - 6-ethoxy-4'-decyloxybenzhydryl 4-heptenoate.

EXAMPLE 43

2-di-n-octylamino-4-pentylthio-2' - decylbenzhydrol+7-octenoyl chloride+triethylamine=2-di-n-octylamino - 4-pentylthio-2'-decylbenzhydryl 7-octenoate.

EXAMPLE 44

2-di-n-butylamino - 5 - chloro-2'-dimethylaminobenzhydrol+4-methyl-3-pentenoyl chloride+triethylamine=2-di-n-butylamino-5-chloro-2' - dimethylaminobenzhydryl 4-methyl-3-pentenoate.

EXAMPLE 45

2-dimethylamino - 5 - chloro-3'-methyl-4'-chlorobenzhydrol+cyclopropylcarbonyl chloride+triethylamine=2-dimethylamino-5-chloro-3'-methyl - 4' - chlorobenzhydryl cyclopropylcarboxylate.

EXAMPLE 46

2-dimethylamino-5-chloro - 2' - decylthiobenzhydrol+ cyclobutylcarbonyl chloride+triethylamine=2 - dimethylamino-5-chloro - 2' - decylthiobenzhydryl cyclobutylcarboxylate.

EXAMPLE 47

2 - dimethylamino-4-decenyl-3'-octyloxybenzhydrol+1-cyclohexene-1 - carbonyl chloride+triethylamine=2 - dimethylamino-4-decenyl - 3' - octyloxybenzhydryl 1-cyclohexene-1-carboxylate.

EXAMPLE 48

2-dimethylamino-5-bromo-2',4' - dimethylbenzhydrol+ cycloheptanecarbonyl chloride+triethylamine=2 - dimethylamino-5-bromo-2',4' - dimethylbenzhydryl cycloheptanecarboxylate.

EXAMPLE 49

2-dimethylamino-5-chloro-3' - nitrobenzhydrol+cyclooctanecarbonyl chloride+triethylamine=2 - dimethylamino - 5 - chloro-3'-nitrobenzhydryl cyclooctanecarboxylate.

EXAMPLE 50

2dimethylamino-5-chloro-3'-di - n - butylaminobenzhydrol+cyclobutanecarbonyl chloride+triethylamine=2-dimethylamino-5-chloro-3'-di - n - butylaminobenzhydryl cyclobutanecarboxylate.

EXAMPLE 51

2-dimethylamino-5-chloro-3',4',5' - trichlorobenzhydrol +1-cyclopentene-1 - carbonyl chloride+triethylamine=2-dimethylamino-5-chloro-3',4',5' - trichlorobenzhydryl 1-cyclopentene-1-carboxylate.

EXAMPLE 52

2-dimethyamino-5-chloro-2'-methylthio-4'-decylbenzhydrol+cyclopentanecarbonyl chloride+triethylamine=2-dimethylamino-5-chloro-2'-methylthio-4'-decylbenzhydryl cyclopentanecarboxylate.

EXAMPLE 53

2-dimethylamino-4-n-butylthio-2'-chlorobenzhydrol+3-cyclopentene-1-carbonyl chloride+triethylamine=2 - dimethylamino-4-n-butylthio-2'-chlorobenzhydryl 3 - cyclopentene-1-carboxylate.

For practical use as acaricides, insecticides and fungicides the compounds of this invention are generally incorporated into acaricidal, insecticidal and fungicidal compositions which comprise an inert carrier and an acaricidally, insecticidally or fungicidally toxic amount of such a compound. Such compositions, which can also be called formulations, enable the active compound to be applied conveniently to the site of the acarid, insect and fungus infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of acaricides, insecticides and fungicides can be dispersed under superatmospheric pressure as aerosols. However, preferred liquid acaricidal, insecticidal, and fungicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the acarid, insect and fungus infestation. The emulsifiers most commonly used in these concentrates are nonionic or mixtures of nonionic with anionic surface-active agents.

A typical acaricidal, insecticidal and fungicidal composition according to this invention is illustrated by the following example, in which the quantities are in parts by weight.

EXAMPLE 54

Preparation of a dust

Product of Example 4 _____ 10
Powdered talc _____ 90

The above ingredients are mixed in a mechanical grinder-blender and are ground until a homogeneous, free-flowing dust of the desired particle size is obtained. This dust is suitable for direct application to the site of the acarid, insect or fungus infestation.

The compounds of this invention can be applied as acaricides, insecticides or fungicides in any manner recognized by the art. One method for destroying acarids, insects and fungi comprises applying to the locus of the acarid, insect or fungus infestation, an acaricidal, insecticidal or fungicidal composition comprising an inert carrier and as the essential active ingredient, in a quantity which is toxic to said acarids, insects or fungi, a compound of the present invention. The concentration of the new compounds of this invention in the acaricidal, insecticidal and fungicidal compositions will vary greatly with the type of formulation and the purpose for which it is designed, but generally the compositions will comprise from about 0.05 to about 95 percent by weight of the active compounds of this invention. In a preferred embodiment of this invention, the acaricidal, insecticidal or fungicidal compositions will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with other insecticides in the insecticidal compositions heretofore described. These other insecticides can comprise from about 5% to about 95% of the active ingredients in the acaricidal or insecticidal compositions. Use of the combinations of these other insecticides with the compounds of the present invention provide acaricidal and insecticidal compositions which are more effective in controlling acarids and insects and often provide results unattainable with separate compositions. The other insecticides with which the compounds of this invention can be used in the compositions to control acarids and insects, can include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbonphenothion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, binapacril, azobenzene, and the like; organic carbamate compounds such as carbaryl, ortho 5353, and the like; organic sulfur compounds such as phenothiazine, phenoxathin, lauryl thiocyanate, [bis(2-thiocyanoethyl) ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorbenzene, and the like.

The compounds of the present invention can also be combined with other fungicidal and nematocidal chemical compounds to form pesticidal compositions useful for the control of fungi and in some cases soil nematodes as well as acarids and insects. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate and the like; while examples of nematodicidal compounds are chloropicrin, O,O-diethyl O-(2,4 - dichlorophenyl)phosphorothioate, tetrachlorothiophene, dazomet, dibromochloropropane, and the like.

The new compounds of this invention can be used in many ways for the control of acarids, insects and fungi.

Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which ban be effectively controlled by the compounds of the present invention are the chewing insects, such as the Mexican bean beetle and the southern armyworm; the piercing-sucking insects, such as the pea aphid, the cereal leaf beetle, the housefly, the grape leafhopper, the chinch bug, the lygus bug, the oyster shell scale, the California red scale, the Florida red scale, the soft scale and mosquitoes; the internal feeders, including borers, such as the European corn borer, the peach twig borer and the corn earworm, worms or weevils, such as the codling moth, the alfalfa weevil, the cotton boll weevil, the pink boll worm, the plum curculio, the red banded leaf roller, the melonworm, the cabbage looper and the apple maggot, leaf miners, such as the apple leaf miner, the birch leaf miner and the beet leaf miner, and gall insects such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites and ticks are not true insects. Many economically important species of mites and ticks can be controlled by the compounds of this present invention, such as the red spider mite, the two-spotted mite, the strawberry spider mite, the citrus rust mite, the cattle tick, the poultry mite, the citrus red mite and the European red mite. Chemicals useful for the control of mites are often called meticides, while those useful for the control of both mites and ticks are known specifically as acaricides.

The quantity of active compound of this invention to be used for acarid or insect control will depend on a variety of factors, such as the specific acarid or insect involved, intensity of the infestation, weather, type of environment, type of formulation, and the like. For example, the application of only one or two ounces of active chemical per acre may be adequate for control of a light infestation of an acarid or insect under conditions unfavorable for its feeding, while a pound or more of active compound per acre may be required for the control of a heavy infestation of acarids or insects under conditions favorable to their development.

The acaricidal activity of the compounds of the present invention was demonstrated in experiments carried out for the control of the two-spotted spider mite (*Tetranychus urticae*).

In one experiment wherein the activity of the compounds of the present invention as contact poisons was determined, the test compounds were formulated at the indicated dosages, as aqueous emulsions of acetone solutions and were sprayed onto Henderson bush lima bean plants, each infested with about 100 adult two-spotted spider mites. The treated plants were then placed into a holding room and were supplied with their daily requirement of water and light. After a period of 5 days the mortality of the mites is determined and is rated on a percentage basis in comparison to untreated controls. The results of this experiment are shown in Table I.

TABLE I

| Test compound | Concentration of test compound in p.p.m. | Percent mortality |
|---|---|---|
| Product of Example: | | |
| 3 | 3,500 | 100 |
| 5 | 3,500 | 100 |
| 6 | 3,500 | 100 |
| 7 | 3,500 | 100 |
| 8 | 3,500 | 97 |
| 9 | 3,500 | 100 |
| 10 | 3,500 | 100 |
| 12 | 3,500 | 90 |
| 13 | 3,500 | 97 |
| 14 | 3,500 | 100 |
| 15 | 3,500 | 96 |
| 20 | 3,500 | 95 |

The insecticidal utility of some of the compounds of this invention was demonstrated in an experiment carried out for the control of the housefly. In this experiment, each of fifty flies was contacted with a test compound by applying 1 ml. of test formulation, containing the indicated concentrations of active compound, to the dorsum of its thorax. The flies were then placed in a wire mesh cage where they were supplied with sugar syrup. At the end of a 24 hour period the mortality of the flies was observed and rated in comparison to a control. The results of this experiment are shown in Table II.

TABLE II

| Test compound | Concentration of test compound in p.p.m. | Percent mortality |
|---|---|---|
| Product of Example: | | |
| 3 | 3,500 | 100 |
| 6 | 3,500 | 100 |
| 8 | 3,500 | 100 |
| 10 | 3,500 | 100 |
| 13 | 3,500 | 100 |

The insecticidal activity of the compounds of this invention was further illustrated in experiments carried out for the control of the pea aphid (*Acyrthosiphon pisum*) by contact. In these experiments ten day old Laxton pea plants contained in small plastic pots were each infested with ten adult pea aphids. The plants and pea aphids were then sprayed with the test compound formulated as an aqueous emulsion of an acetone solution at various concentrations. The infested plants were then placed in a holding chamber maintained at a constant temperature for a period of 48 hours. After this time the mortality of the aphids was determined and rated on a percent basis in comparison to a control. The results of this experiment are shown in Table III.

TABLE III

| Test compound | Concentration of test compound in p.p.m. | Percent control of pea aphids contact test |
|---|---|---|
| Product of Example: | | |
| 3 | 3,500 | 90 |
| 3 | 1,000 | 100 |
| 9 | 3,500 | 100 |
| 10 | 3,500 | 89 |
| 13 | 3,500 | 89 |
| 15 | 3,500 | 100 |

The new compounds of this invention are fungicidal in their ability to kill, inhibit, or inactivate a fungus so that it does not grow. Practically, these compounds can be used to prevent fungi and molds from harming cloth, wood, plants, seeds, fruit, animals, or whatever else they attack. The fungicidal compounds should preferably be applied before the infection has occurred and certainly before it has progressed very far.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber (*Erisiphe cichoracearum*), cereal leaf rust on wheat (*Puccinia rubigo-vera*), and such common soil fungi as fusarium wilt (*Fusarium oxysporum*), the seed rot fungus (*Phythium debaranum*), and the sheath and culm blight (*Rhizoctonia solani*). The new compounds of this invention can also be employed as industrial fungicides to control a variety of fungi which attack such material as adhesives, cork, paints, lacquers, leather, wood, plastics and textiles, such as cotton and wool.

The quantity of active compound of this invention to be used for good disease control will depend on a variety of factors, such as the particular disease involved, the intensity of the infestation, formulation, weather, type of crop and the like. Thus, while the application of only one or two ounces of active compound per acre of a crop may be sufficient to control a light infestation of certain fungi, a pound or more of active compound per acre may be required to control a heavy infestation of a hardy species of fungus.

We claim:
1. A compound of the formula

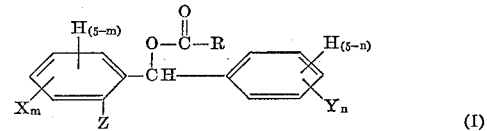

(I)

wherein Z is diloweralkylamino; X and Y are independently selected from the group consisting of lower alkyl, lower alkenyl, halogen, nitro, lower alkoxy, di-lower alkylamino and lower alkylthio; m is an integer from 0 to 4; n is an integer from 0 to 5; R is selected from the group consisting of lower alkyl, lower alkenyl, halo lower alkyl, halo lower alkenyl, lower alkoxy lower alkyl, lower alkyl thio lower alkyl, and thiocyano lower alkyl.

2. The compound of claim 1, 2-dimethylamino-5-chloro-2'-methylbenzhydryl acetate.

3. The compound of claim 1, 2-dimethylamino-5-chloro-2'-methylbenzhydryl β-chloropropionate.

4. The compound of claim 1, 2-dimethylamino-5-chloro-2'-methylbenzhydryl propionate.

5. The compound of claim 1, 2-dimethylamino-5-chloro-2'-methylbenzhydryl isobutyrate.

6. The compound of claim 1, 2-dimethylamino-5-chloro-2'-methylbenzhydryl isovalerate.

References Cited

Schmutz, J. et al.: Helv. Chim. Acta, 48(a), 336–47 (1965).

JAMES A. PATTEN, Primary Examiner

P. J. KILLOS, Assistant Examiner

U.S. Cl. X.R.

260—410.5, 454, 465 D, 468 P, 468 R, 481 R, 482 R, 484 R, 486 H, 486 R, 490, 570 A; 424—311, 314

UNITED STATES PATENT OFFICE
CERTIFICATE OF CORRECTION

Patent No. 3,655,734   Dated April 11, 1972

Inventor(s) Sidney B. Richter and David P. Mayer

It is certified that error appears in the above-identified patent and that said Letters Patent are hereby corrected as shown below:

In column 1, lines 13 to 18 the portion of the formula appearing as

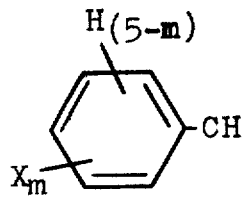

should read

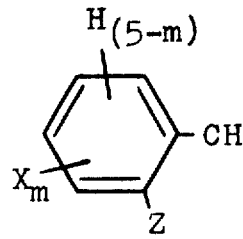

In column 1, lines 32 to 38 the portion of the formula appearing as

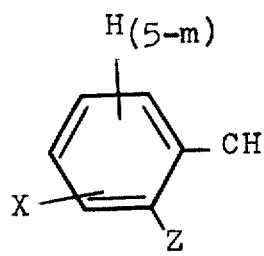

UNITED STATES PATENT OFFICE
CERTIFICATE OF CORRECTION

Patent No. 3,655,734    Dated April 11, 1972

Inventor(s) Sidney B. Richter and David P. Mayer    PAGE -2

It is certified that error appears in the above-identified patent and that said Letters Patent are hereby corrected as shown below:

should read

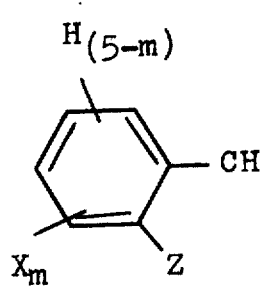

Signed and sealed this 8th day of August 1972.

(SEAL)
Attest:

EDWARD M. FLETCHER, JR.          ROBERT GOTTSCHALK
Attesting Officer                Commissioner of Patents